Journal of American Chemical Society, vol. 96, pp. 6559–6568.
Journal of the American Chemical Society, vol. 95, pp. 6395–6400.
(List continued on next page.)

United States Patent [19]
Tateoka et al.

[11] Patent Number: 4,962,013
[45] Date of Patent: Oct. 9, 1990

[54] PHOTOCHROMIC MATERIAL CONTAINING A SPIROOXAZINE AND A NITROXY FREE RADICAL TRIPLET STATE QUENCHER

[75] Inventors: Yasuo Tateoka, Machida; Masashi Ito, Yokosuka; Shuichi Maeda, Hidaka; Kazuo Mitsuhashi; Tetsuo Murayama, both of Machida, all of Japan

[73] Assignees: Nissan Motor Co., Ltd. Yokohama; Mitsubishi Kasei Corporation, both of Tokyo, Japan

[21] Appl. No.: 257,903

[22] Filed: Oct. 14, 1988

[30] Foreign Application Priority Data

Oct. 16, 1987 [JP] Japan .................. 62-259778
Jul. 26, 1988 [JP] Japan .................. 63-186376
Sep. 7, 1988 [JP] Japan .................. 663-223786

[51] Int. Cl.$^5$ .................. G03C 1/735; G03C 1/73
[52] U.S. Cl. .................. 430/338; 430/337; 252/586
[58] Field of Search .................. 544/71; 430/332, 345, 430/340, 270, 341, 342, 343, 337, 338; 252/586; 522/63, 39, 901

[56] References Cited

U.S. PATENT DOCUMENTS

| | | | |
|---|---|---|---|
| 3,562,172 | 2/1971 | Ono et al. | 544/71 |
| 4,699,473 | 10/1987 | Chu | 544/71 |
| 4,719,296 | 1/1988 | Irie et al. | 544/71 |
| 4,720,356 | 1/1988 | Chu | 252/586 |
| 4,785,097 | 11/1988 | Kwzk | 544/71 |

FOREIGN PATENT DOCUMENTS 60-205429 10/1985 Japan .

OTHER PUBLICATIONS

Modern Plastics Encyclopedia, vol. 61, No. 10A, 1984–85, pp. 179–180.
Chemical Abstracts, vol. 64, 1966, entry 19887 b.
Modern Plastics Encyclopedia, vol. 61, No. 10A, 1984–85, pp. 106–107.

Primary Examiner—Roland E. Martin
Assistant Examiner—Christopher D. RoDee
Attorney, Agent, or Firm—Foley & Lardner, Schwartz, Jeffery, Schwaab, Mack, Blumenthal & Evans

[57] ABSTRACT

A photochromic material to be used for a photosensitive arrangement such as photosensitive laminated glass. The photochromic material is formed of a high polymer substrate material containing photochromic spirooxazine compound as expressed by the following general formula:

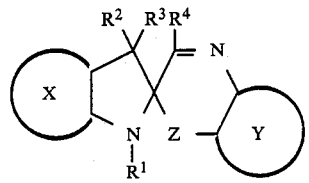

where $R^1$, $R^2$ and $R^3$ are at least one selected from the group consisting of alkyl group, alkenyl group, cycloalkyl group and aryl group; $R^4$ is one selected from the group consisting of hydrogen atom and alkyl group having the number of carbon atoms ranging from 1 to 5; rings X and Y are at least one selected from the group consisting of hydrocarbon aromatic ring and heterocyclic aromatic ring; and Z is one selected from the group consisting of oxygen atom and sulfur atom. Additionally, a triplet state quencher such as nitroxy free radical is contained in the high polymer substrate material, thereby suppressing generation of deterioration substance due to irreversible reaction of spirooxazine molecules.

27 Claims, 1 Drawing Sheet

OTHER PUBLICATIONS

Photochromism, G. H. Dorion et al., The Focal Press, London, 1970, pp. 14-21.

"New Experimental Chemical Lecture", Japan Chemical Society, pub. Maruzen Co. Ltd., vol. 14, pp. 1594 to 1598.

Photochromism of Spirooxazines, S. Schneider et al., "Investigation of the Primary Processes in the Ring-opening Reaction by Picosecond Time-Resolved Absorption and Emission Spectroscopy", Ber Bunsenges. Phys. Chem. 91, 1987, pp. 1222-1224.

"New Experimental Chemical Lecture", Japan Chemical Society, pub. Maurzen Co. Ltd., vol. 14, (partial translation).

PHOTOCHROMIC MATERIAL CONTAINING A SPIROOXAZINE AND A NITROXY FREE RADICAL TRIPLET STATE QUENCHER

BACKGROUND OF THE INVENTION

1. Field of the Invention

The present invention relates to a photochromic material which is excellent in weatherability and to be used as an essential part of a photosensitive arrangement.

2. Description of the Prior Art

Hitherto a variety of photosensitive arrangements have been proposed and put into practical use. One of them is in the form of a transparent plastic film 1 in which spirooxazine photochromic compound is dispersed as shown in FIG. 1. Another one is of a laminated arrangement wherein a transparent plastic film 1 containing photochromic compound is coated on a base plate 2 such as glass plate or transparent plastic plate as shown in FIG. 2. A further one is a laminated arrangement in which a transparent plastic film 1 containing photochromic compound is put between the base plates 2. Such laminated arrangements are disclosed, for example, in Japanese Patent Provisional Publication No. 60-205429.

However, drawbacks have been encountered in the above-discussed photosensitive arrangements including the photochromic materials, in which an irreversible deterioration substance tends to be produced during coloring and decoloring reactions in the photochromic material containing spirooxazine compound. Accordingly, such photochromic material is considerably deteriorated under light irradiation for a long time.

SUMMARY OF THE INVENTION

As a result of a variety of research to solve the above-discussed problems in the photochromic material containing spirooxazine compound, the inventors have found that undesired compound can be prevented from being produced during coloring and decoloring reactions by adding a triplet state quencher to the high polymer material containing spirooxazine compound, thus leading to the present invention.

A photochromic material of the present invention comprises a substrate material formed of high polymer; a spirooxazine compound contained in said substrate material and expressed by the general formula:

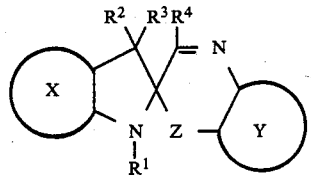

where $R^1$, $R^2$ and $R^3$ are at least one selected from the group consisting of alkyl group, alkenyl group, cycloalkyl group and aryl group; $R^4$ is one selected from the group consisting of hydrogen atom and alkyl group having the number of carbon atoms ranging from 1 to 5; rings X and Y are at least one selected from the group consisting of hydrocarbon aromatic ring and heterocyclic aromatic ring; and Z is one selected from the group consisting of oxygen atom and sulfur atom; and a triplet state quencher contained in the substrate material.

Thus, since the photochromic material of the present invention includes the triplet state quencher such as nitroxy free radical in addition to spirooxazine photochromic material, production of irreversible deterioration substance can be suppressed at a level of 1/5 of that in conventional photochromic materials. Accordingly, the photochromic material of the present invention is greatly improved in weatherability as compared with the conventional ones and therefore can be used for recording material, copying material, electronic photosensitive material such as laser photosensitive material, printing photosensitive material, light controlling material, and a photosensitive material of the display of an electronic device. Additionally, reddening of the photochromic material in the laminated arrangement as shown in FIG. 3 can be effectively prevented by virtue of the triplet state quencher.

BRIEF DESCRIPTION OF THE DRAWINGS

In the drawing, the same reference numerals designate the corresponding elements and parts; in which.

DETAILED DESCRIPTION OF THE INVENTION

Figure 1:
FIG. 1 is a side view of a conventional film containing photochromic material.
Figure 2:
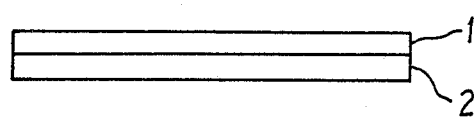
FIG. 2 is a side view of a conventional laminated arrangement in which a layer of photochromic material is coated on a base plate.
Figure 3:
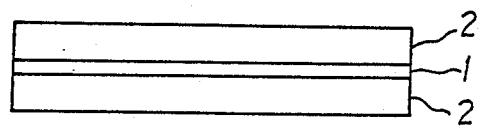
FIG. 3 is a side view of another conventional laminated arrangement in which a layer of photochromic material is put between two base plates.

According to the present invention, a photochromic material comprising a substrate material formed of high polymer; a spirooxazine compound contained in said substrate material and expressed by the general formula:

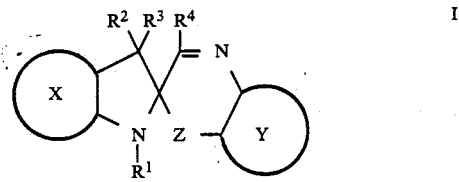

where $R^1$, $R^2$ and $R^3$ are alkyl group, alkenyl group, cycloalkyl group and/or aryl group; $R^4$ is one selected from the group consisting of hydrogen atom and alkyl group having the number of carbon atoms ranging from 1 to 5; rings X and Y are hydrocarbon aromatic ring and/or heterocyclic aromatic ring; and Z is oxygen atom or sulfur atom; and a triplet state quencher contained in said substrate material. In this photochromic material, the alkyl group, alkenyl group, cycloalkyl group and aryl group are ones substituted or unsubstituted. $R^2$ and $R^3$ may be cyclized with each other. $R^1$ may include another spirooxazine rings bonded through at least one of the groups consisting of alkylene group and arylene group.

Additionally, the hydrocarbon aromatic ring and heterocyclic aromatic ring may have been substituted at least a part thereof.

In the compound expressed by the above-mentioned formula I, examples of $R^1$, $R^2$ and $R^3$ are alkyl groups which are substituted or not substituted and include alkyl group such as one having the number of carbon atoms ranging from 1 to 28, alkoxyalkyl group such as methoxyethyl group and ethoxyethyl group, alkoxyalkoxyalkyl group such as methoxyethoxyethyl group and n-butoxyethoxyethyl group, alkoxyalkoxyalkoxy-alkyl group such as methoxyethoxyethoxyethyl group and ethoxyethoxy ethoxyethyl group, aryloxyalkyl group such as phenyloxyethyl group, naphtyloxyethyl group and p-chlorophenyloxyethyl group, arylalkyl group such as benzyl group, phenethyl group, p-chlorobenzyl group and p-nitrobenzyl group, cycloalkylalkyl group such as cyclohexylmethyl group, cyclohexylethyl group and cyclopentylmethyl group, alkenyloxyalkyl group which is substituted or not substituted and includes allyloxyethyl group and 3-bromoallyloxyethyl group, cyanoalkyl group such as cyanoethyl group and cyanomethyl groups hydroxyalkyl group such as hydroxyethyl and hydroxymethyl, and tetrahydrofurylalkyl group such as tetrahydrofurfuryl group and tetrahydrofurylethyl group; alkenyl group which is substituted or not substituted and includes allyl group and 2-chloroallyl group; aryl group which is substituted or not substituted and includes phenyl group, p-methylphenyl group, naphthyl group and m-methoxyphenyl group; and cycloalkyl group such as group and cyclopentyl group. $R^2$ and $R^3$ may be coupled with each other to form cyclohexyl, group, cyclopentyl group and cyclopentyl group. $R^1$ may be coupled with another spirooxyazine rings through alkylene and/or arylene group to form a dimer as a whole. Examples of $R^4$ are hydrogen atom o and alkyl group having the number of carbon atoms ranging from 1 to 5 such as methyl group and ethyl group.

Examples of hydrocarbon aromatic and heterocyclic aromatic rings (as the rings X and Y) at least a part of which may have been substituted with a substituent are benzene ring, naphthalene rings, quinoline rings and phenanthrene rings. Examples of the substituent for these ring or rings are halogen atom such as chlorine atom, bromine atom and iodine atom, alkyl group having the number of carbon atoms ranging from 1 to 6, alkoxyl group, alkoxycarbonyl group, alkoxysulfonyl group such as methoxysulfonyl group and ethoxysulfonyl group, cyano group, amino group, dimethylamino group, and nitro group.

Of spirooxazine compounds expressed by the formula I, a spirooxazine compound expressed by the following general formula II is preferably used:

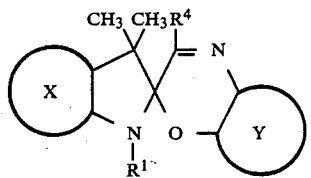

where $R^1$ is alkyl group having the number of carbon atoms ranging from 1 to 20 or alkoxyalkyl group; $R^4$ is hydrogen atom or methyl group; X and Y are hydrocarbon aromatic ring and/or heterocyclic aromatic ring which may be substituted at least a part thereof.

As the triplet state quencher, nitroxy free radial is preferably used. In general, the nitroxy free radical is a free radical which has a structure of >NO⟵⟶>N-+O−. The nitroxy free radical of various nitroxy free radials, to be used as a part of the photochromic material of the present invention, is stable and can be singly separated. Such a nitroxy free radial is known per se and disclosed, for example, in a literature "New Experimental Chemical Lecture" (Volume 14, Page 1594 and 1598) compiled by the Japan Chemical Society and published by Maruzen Co., Ltd. in Japan, in which the nitroxy free radical includes (i) one in which unpaired electron can enter a conjugated system as expressed by a below formula (a); (ii) one which has a bulky alkyl group as expressed by a below formula (b); and (iii) bicycloaminoxyl which is stopped in reaction in the stage of aminoxyl without being oxidized to nitro according to Bredt rule as expressed by a below formula (c):

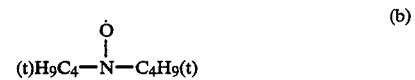

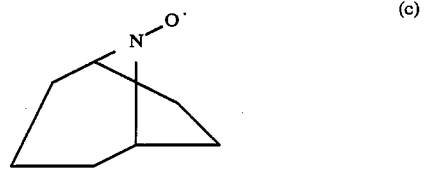

Synthesis of the nitroxyl free radicals is carried out according to the methods disclosed, for example, in this reference.

It will be understood that nitroxy free radicals listed in a table 7.66 on Page 1597 of the above-mentioned literature can be also used as the nitroxy free radical of the present invention.

In the present invention, the below-listed nitroxy free radicals are preferably used from the viewpoints of heat resistance and activity maintaining ability.

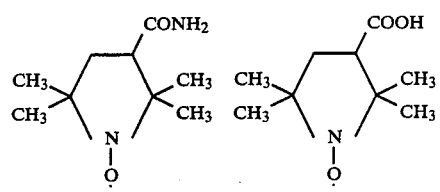

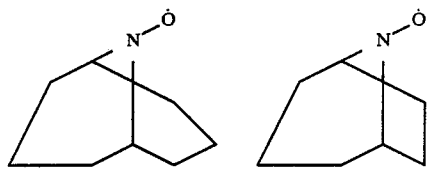

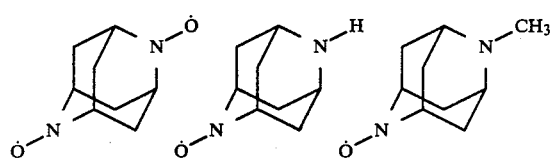

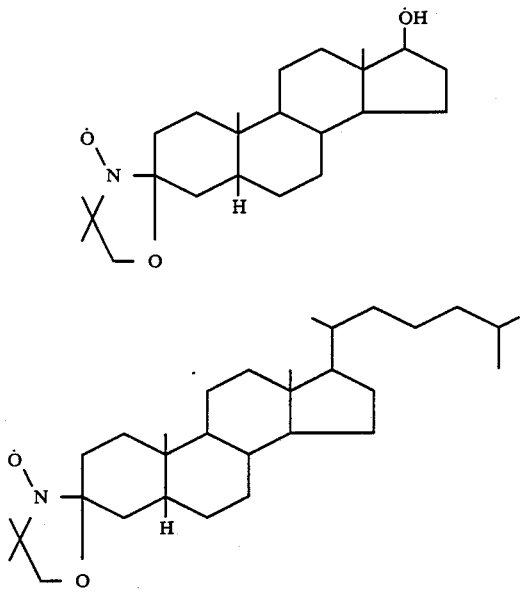

Used as the high polymer of the substrate material are a variety of synthetic resins which are good in compatibility with the above-mentioned spirooxazine compounds and nitroxy free radicals, optically transparent and excellent in film formation ability. Examples of the high polymer are polymethyl methacrylate, polystyrene, polyvinyl acetate, polyvinyl butyral, cellulose acetate, polyvinyl chloride, polyvinylidene chloride, vinyl chloride-vinyl acetate copolymer, polypropylene, polyethylene polyacrylonitrile, polyurethane resin, epoxy resin, phenoxy resin and polyester resin. It will be understood that examples of the high polymer of the present invention are not limited to the above-listed resins and may be resins containing plasticizer or cross-linked as occasion demands. Of the above-listed resins, polyvinyl buryral is preferable from the view points of practical use and safety.

The photochromic material of the present invention is used, for example, in the form of a photosensitive film, and as a photosensitive layer formed on a base plate or put between two base plates, the base plate being, for example, formed of polyethylene terephthalate, cellulose acetate, polycarbonate and glass. The photosensitive layer or film of the photochromic material of the present invention has preferably a thickness ranging from 0.5μ to 1 mm, more preferably 10 to 250μ.

The spirooxazine compound of the present invention is used preferably in an amount ranging from 0.1 to 50% by weight, more preferably 0.5 to 20% by weight relative to the substrate material of the high polymer. If the amount of the spirooxazine compound is less than 0.1% by weight, a sufficient optical concentration cannot be obtained upon coloring by the photochromic dye. Even if the amount of the same is more than 50% by weight, the optical concentration is kept at the same level while causing a cost increase.

The photochromic material of the present invention is prepared, for example, by dissolving the spirooxazine compound, the of high polymer material and the nitroxy radical in a suitable solvent to obtain a solution, and thereafter by coating the solution on a suitable transparent support member by means of casting or spinner. In this case, the quencher of triplet state compound is used preferably in an amount ranging from 0.1 to 50% by weight, more preferably 0.5 to 20% by weight relative to the higher polymer material. If the amount of the triplet state quencher is less than 0.1% by weight, no effect is exhibited. Even if the amount of the same exceeds 50% by weight, improvement in effect is not exhibited while increasing cost.

It is to be noted that the photochromic material of the present invention is remarkably improved in weatherability as compared with conventional photochromic materials. Such effect is thought to be caused by the fact the that excited triplet state of colorless and colored source causing irreversible deterioration reaction of spirooxazine molecule is changed into the ground (normal) state so that the spirooxazine molecule is returned to its ground state under the effect of the triplet state quencher, thus preventing production of irreversible deterioration reaction caused from the excited triplet state.

As described above, the photochromic material of the present invention is, for example, formed into a film and used as an intermediate film of a laminated glass. In this case, the intermediate film is, for example, formed by dissolving the spirooxazine compound, the high polymer material and the nitroxy free radical in suitable solvent to obtain a solution, and thereafter by coating the solution onto at least a part of a plastic film by means of screen printing, casting or spinning. The plastic film may be embossed. The thus formed intermediate film is securely put between two glass base plates to obtain a photosensitive laminated glass which will be used for a variety of purposes.

The above plastic film mainly includes suitable thermoplastic resin and plasticizer. Examples of the thermoplastic resin are poly(metha)acrylic ester such as polymethyl (meth)acrylate, polystyrene, polyvinyl ester such as polyvinyl acetate, polyvinyl halide such as polyvinyl chlorides polyester such as polyethylene terephthalate, polyurethane, and polyvinyl acetal such as polyvinyl butyral. Of these thermoplatic resins, polyvinyl butyral which is usually used for a laminated safety glass is preferable. Examples of the plasticizer are phthalate such as dibutyl phthalate and dioctyl phthalate, adipate such as dioctyl adipate, phosphate such as tricresyl phosphate, polyester, and triethylene glycol di-2-ethyl butyrate. These plasticizers are used singly or in combination.

It is preferable that the high polymer material forming part of the photochromic material of the present invention is the same as the plastic material of the intermediate film of the laminated glass.

Additionally, in case plasticizer is to be contained in the high polymer material forming part of the photochromic material, the plasticizer is selected from the above-listed ones for the plastic film of the intermediate film.

Preferably, the photochromic material containing the high polymer material, the spirooxazine compound and triplet state quencher further contains at least one of a hindered amine compound, phenolic compound and nickel complex in order to improve dark place preservation ability so that yellowing phenomena of the photochromic material is prevented.

The hindered amine compound is known as a light stabilizer and has an effect to prevent yellowing of the photochromic material containing the nitroxy free radical. As the hindered amine compound, a compound having one or more organic group expressed by the following formulae III or IV in a molecule is used:

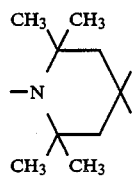   III

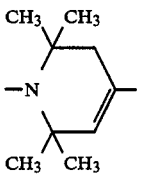   IV

Of compounds of such a type, a compound expressed by the following formula V is preferably used:

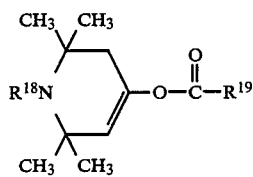   V wherein $R^{18}$ and $R^{19}$ are alkyl group, cycloalkyl group and/or alkenyl group which are substituted or not substituted; and $R^{18}$ and $R^{19}$ may have one or more further hindered amine groups such as

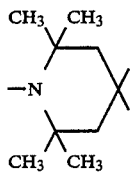   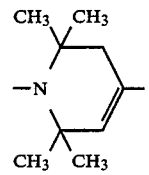

Additionally, compounds expressed by a following formulae VI, VII and VIII are used as the hindered amine compound:

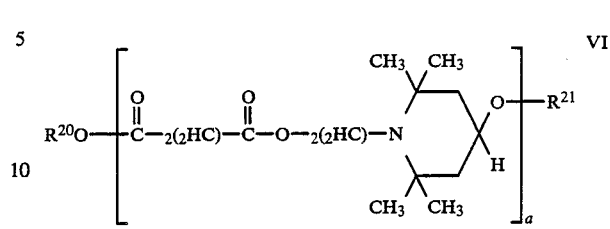   VI where $R^{20}$ is alkyl group; $R^{21}$ are hydrogen atom and/or alkyl group which is substituted or not substituted; and a indicates the number ranging from 1 to 40.

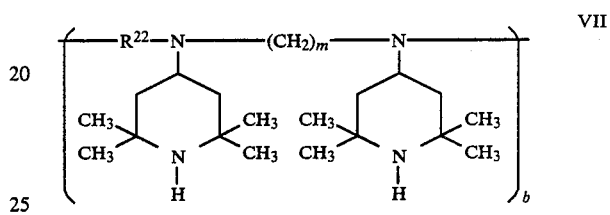   VII where $R^{22}$ is $-(CH_2)_n-$ or triazine ring which are substituted or not substituted; and b is a number ranging from 1 to 40.

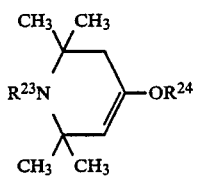   VIII where $R^{23}$ and $R^{24}$ are alkyl group, cycloalkyl group and/or alkenyl group which are substituted or not substituted.

Preferable examples of the hindered amine compound are listed below:

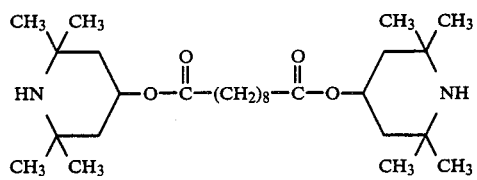   C-1

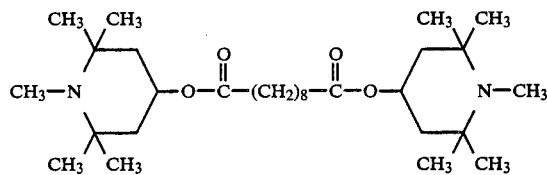   C-2

-continued
C-3
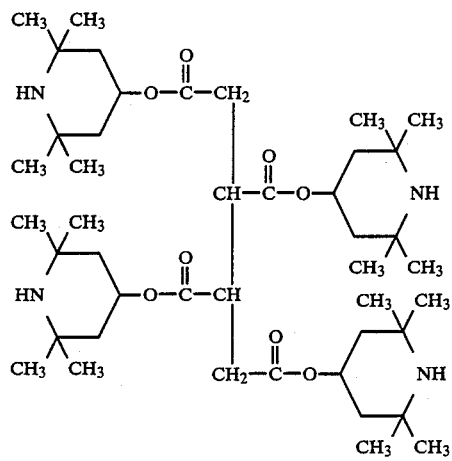
C-4
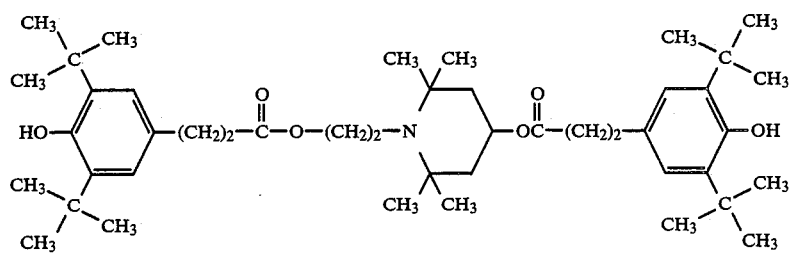
C-5
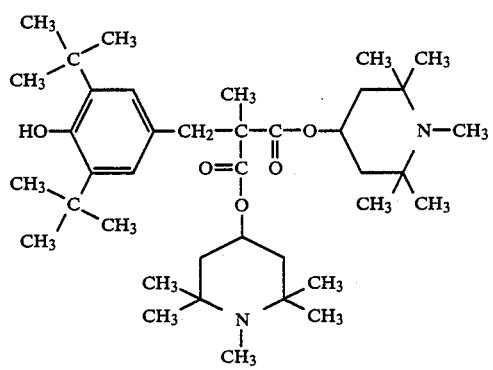
C-6
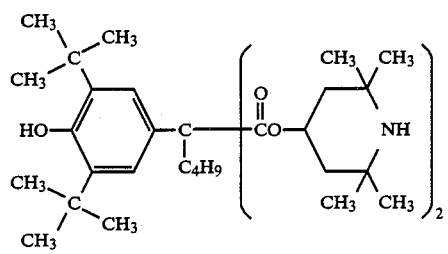
C-7
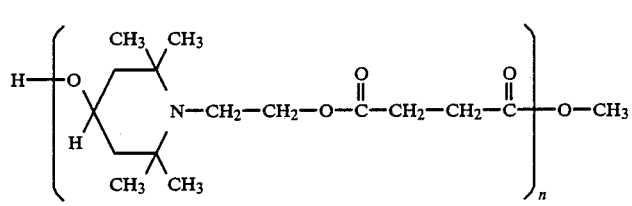
(n = 1~20)

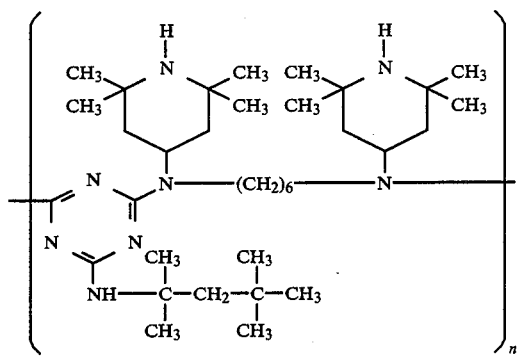
C-8
(n = 1~20)
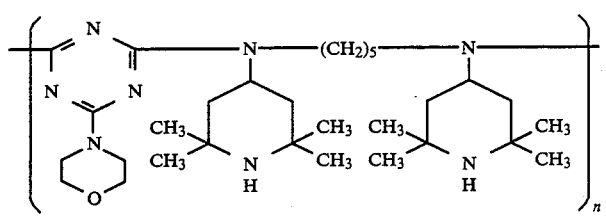
C-9
(n = 1~20)
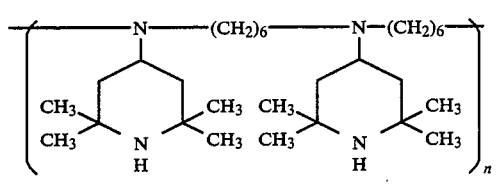
C-10
(n = 1~20)
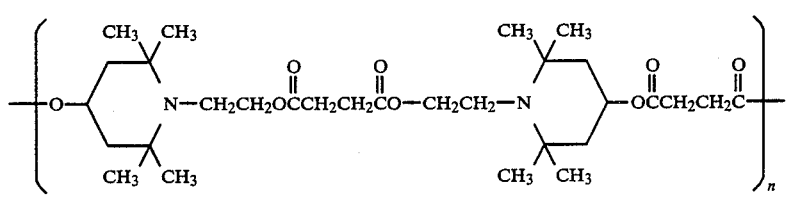
C-11
(n = 1~20)
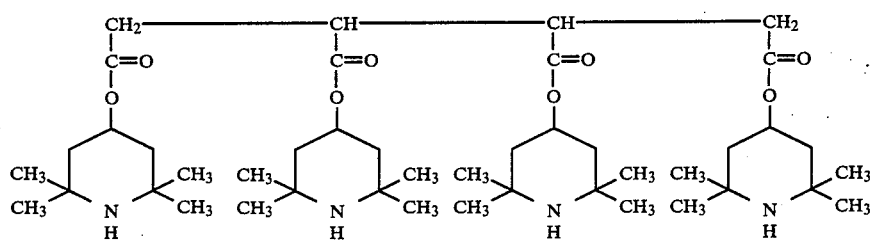
C-12
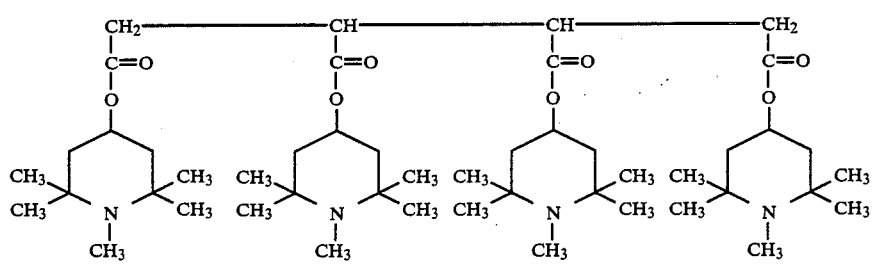
C-13

-continued
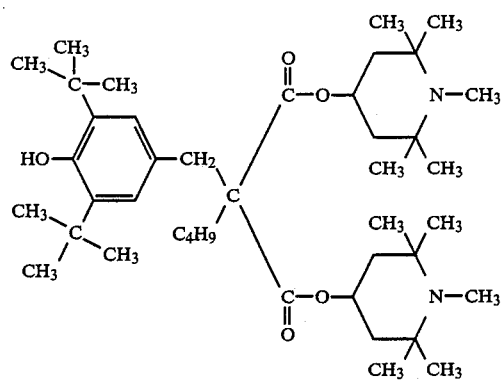 C-14
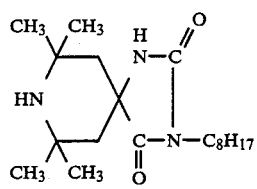 C-15
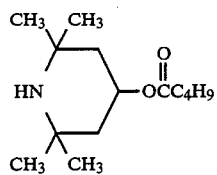 C-16
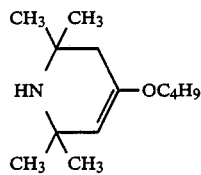 C-17
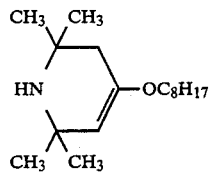 C-18
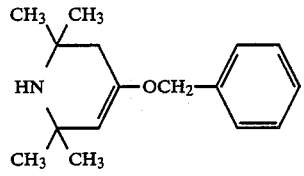 C-19
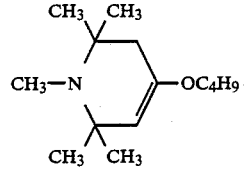 C-20
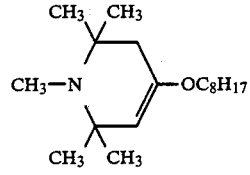 C-21

The phenolic compound is known as an antioxidant and has an effect of preventing yellowing of the photochromic material. As the phenolic compound, compounds expressed by the following general formula IX are used:

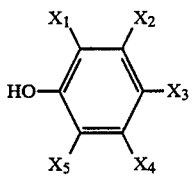    IX wherein $X^1$, $X^2$, $X^3$, $X^4$ and $X^5$ are hydrogen atom, halogen atom, alkyl group which may be substituted, amino group which may be substituted, alkoxy group, phenoxy group, and/or hydroxy group in which $X^3$ is not hydrogen atom; when $X^3$ is the above-mentioned group or atom, $X^1$ and $X^5$ are not hydrogen atom so as to express a hindered phenolic compound as a whole; and $X^3$ may be a group which is coupled with another phenolic group directly or through oxygen atom, sulfur atom, sulfonyl group, carbonyl group, alkylene group and alkenyl group which may be substituted.

Of phenolic compounds expressed by the formula IX, a phenolic compound expressed by the following formulae X or is XI is preferably used:

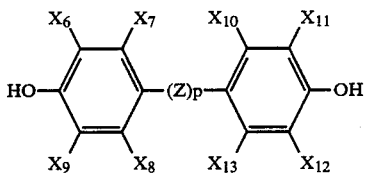    X where Z is oxygen atom, sulfur atom, sulfonyl group, carbonyl group, and alylene group and alkenylene group which may be substituted; p is 0 or 1; and $X^6$, $X^7$, $X^8$, $X^9$, $X^{10}$, $X^{11}$, $X^{12}$ and $X^{13}$ are hydrogen atom, halogen atom and/or alkyl group.

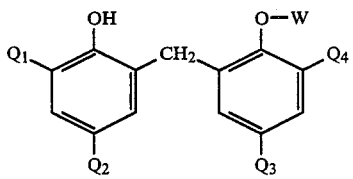    XI where W is

($Q^5$ is alkyl group or vinyl group) or hydrogen atom; and $Q^1$, $Q^2$, $Q^3$ and $Q^4$ are alkyl group.

In the above formula IX, $X^3$ may be the substituent having the hindered amine group which, for example, has the following group:

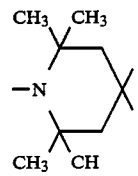

Additionally, in the above-formula X, the alkylene group (for Z) which may be substituted may have another phenolic group.

Examples of the phenolic compound are listed below:

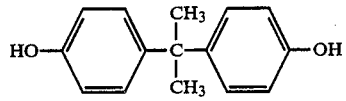    D-1

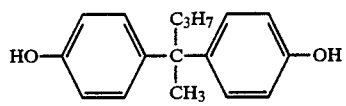    D-2

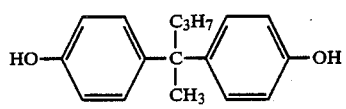    D-3

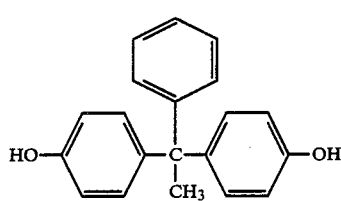    D-4

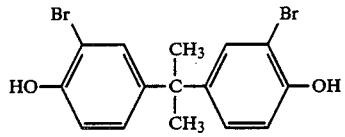    D-5

-continued
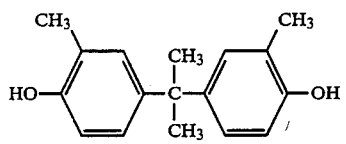 D-6
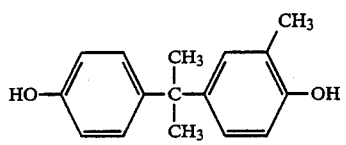 D-7
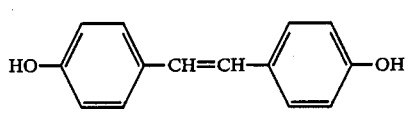 D-8
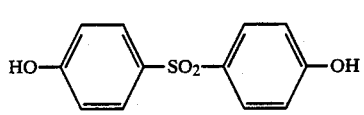 D-9
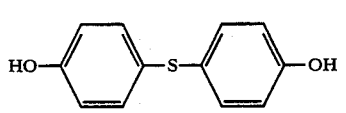 D-10
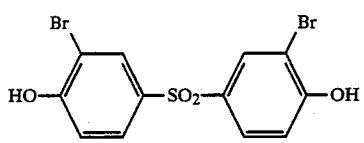 D-11
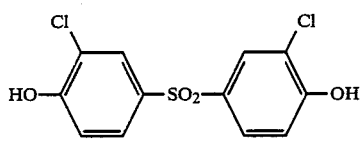 D-12
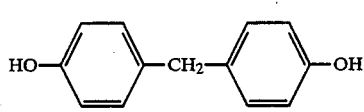 D-13
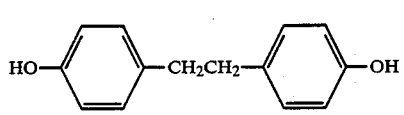 D-14
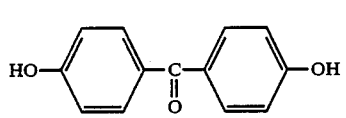 D-15
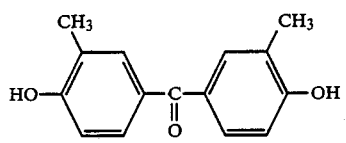 D-16

-continued
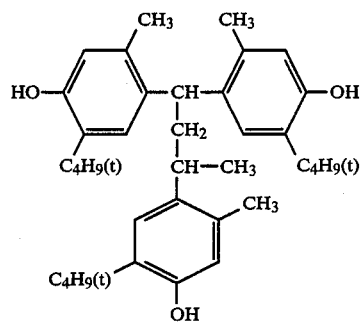
D-17
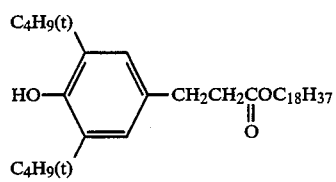
D-18
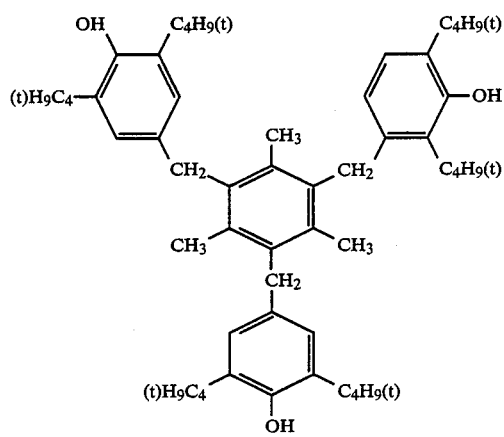
D-19
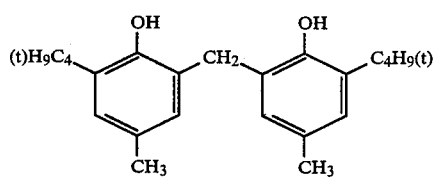
D-20
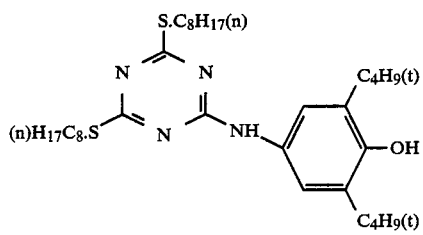
D-21
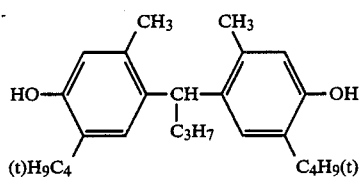
D-22

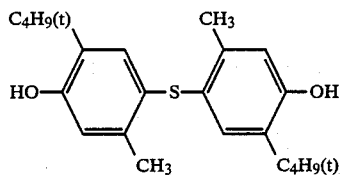
D-23
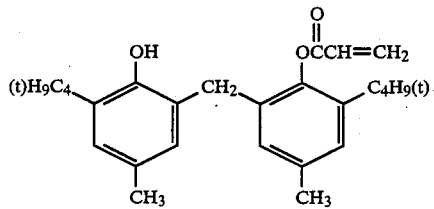
D-24
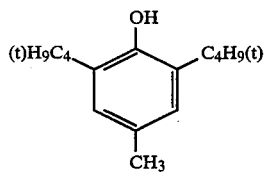
D-25
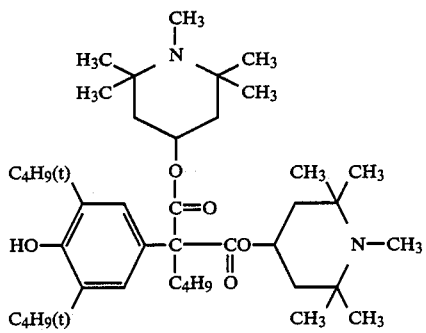
D-26
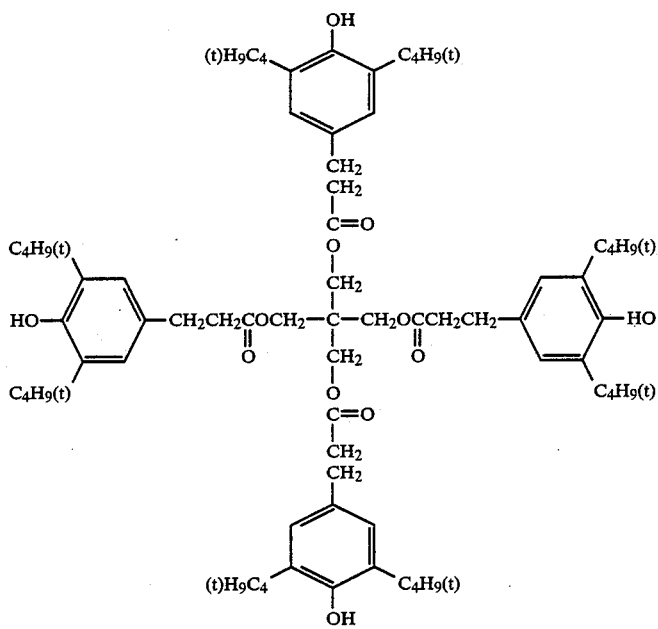
D-27
Of the above-listed phenolic compounds, the last-listed one (D-27) is preferable.
The nickel complex is known as a single state quencher and has the effect of preventing yellowing of the photochromic material containing the nitroxy free radical. As the nickel complex, compound expressed by the following formulae XII or XIII is used:

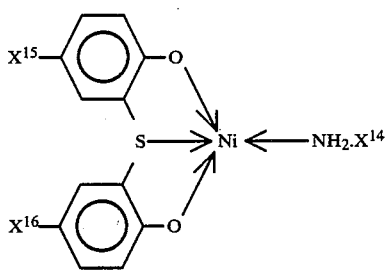

where $X^{14}$, $X^{15}$ and $X^{16}$ are alkyl groups having the number of carbon atoms ranging from 1 to 10.

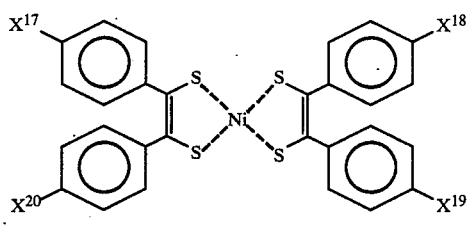

where $X^{17}$, $X^{18}$, $X^{19}$ and $X^{20}$ are hydrogen atom, alkyl group and/or alkoxy group.

Examples of the nickel complex are listed below:

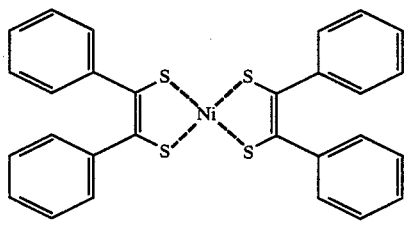

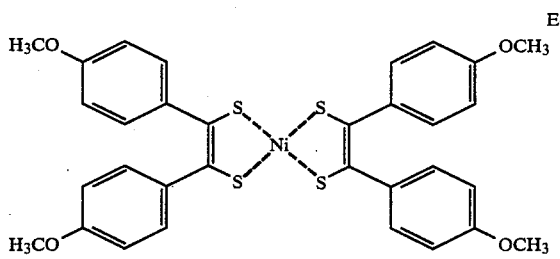

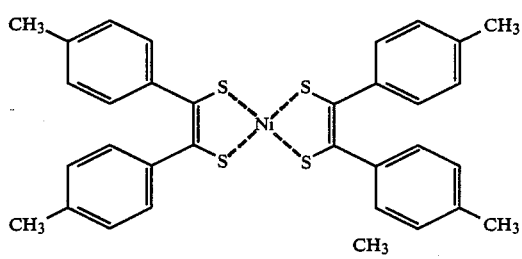

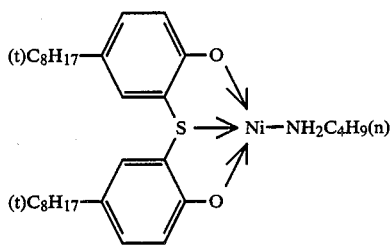

In Order to prepare the photochromic material containing one or more selected from the group of the hindered amine compound, the phenolic compound and the nickel complex, more or them are, for example, dissolved in suitable solvent to obtain a solution. In this case, the high polymer material used as forming part of the photochromic material has a good compatibility with the hindered amine compound, the phenolic compound and the nickel complex. The thus obtained solution will be thereafter coated on a support member such as the plastic film.

It is to be noted that the phenolic compound is preferable among the hindered amine compound, the phenolic compound and the nickel complex. Of the phenolic compounds, the above-mentioned one (D-27) is most preferable. The total amount of the hindered amine compound, the phenolic compound and the nickel complex to be used is preferably within a range from 0.1 to 50% by weight, more preferably 0.5 to 20% by weight relative to the high polymer material.

Additionally, it is preferable that the hindered amine, the phenolic compound and the nickel complex are used in the same amount as the nitroxy free radial.

It will be appreciated that the photochromic material of the present invention exhibits excellent effects in which yellowing phenomena of the photochromic material during storage in dark place can be prevented under mutual action of the nitroxy free radical and one or more of the hindered amine compound, the phenolic compound and the nickel complex. As a result, dark place preservation stability is remarkably improved, and therefore there arises no color change even upon preservation for a long period of time without affecting color tone of developed color. Such a photochromic material is used for light controlling material such as vehicular and architectural light controlling glasses, optical filters, masking materials, and a luminous energy meter.

EXAMPLES AND COMPARATIVE EXAMPLES

The present invention will be more readily understood with reference to the following examples in comparison with comparative examples; however, these examples are intended to illustrate the invention and not to be construed to limit the scope of the invention.

First in order to evaluate the photochromic material containing the spirooxazine compound, the triplet state quencher and the high polymer material, experiment was conducted as follows:

EXAMPLE 1-1 and COMPARATIVE EXAMPLE 1-1

0.1 by weight of a spriooxazine compound A of the structure indicated by the following formula:

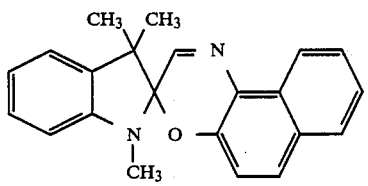

0.1% by weight of a nitroxy free radical of the structure indicated by the following formula:

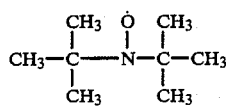

and 10% by weight of polyvinyl butyral were dissolved in solvent (toluene: ethanol =6:4) to obtain a solution. The solution was coated on a glass base plate by casting thereby to form a coating film. The coating film was dried for 6 hours in a vacuum drier under vacuum. Thereafter a glass plate was put on the dried coating film and tightly attached under vacuum thereby to obtain a photosensitive arrangement or sample of Example 1 including the photochromic material of the present invention.

Additionally, a photosensitive arrangement or sample of Comparative Example 1 was produced in a similar manner to that of Example 1 with the exception that no nitroxy radial was used.

In order to evaluate performance (weatherability) of these photosensitive arrangements, an evaluation test was conducted as follows: First the initial coloring ability of the sample (the photosensitive arrangement) was measured by a xenon lamp. Next, the sample was exposed to light radiation in a sunshine weatherometer (produced by Suga Test Instrument Co., Ltd. in Japan) to promote deterioration of the photochromic material in the sample, measuring change or deterioration of coloring ability upon lapse of time. The performance (weatherability) of the sample was evaluated by residual coloring ability and expressed as a time (hours) during which 50% of the initial colouring ability was maintained.

EXAMPLES 1-2 TO 1-36 and COMPARATIVE EXAMPLES 1-2 and 1-3

Photosensitive arrangements or samples of Examples 1-2 to 1-36 were produced in a similar manner to that in Example 1 by using spirooxazine compounds B and C of the structures indicated by the below formulae and a variety of combinations shown in Tables 1A to 1C. Additionally, photosensitive arrangements or samples of Comparative Examples 1-2 to 1-3 were produced in a similar manner to that in Examples 1-2 to 1-36 with the exception that no nitroxy radical was used. An evaluation test was conducted on each sample a similar manner to that in Example 1 in order to evaluate weatherability of the photochromic material of the photosensitive arrangement.

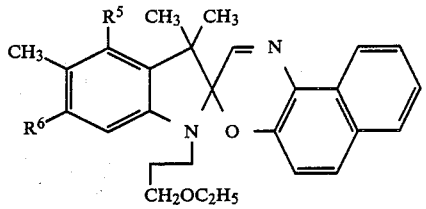

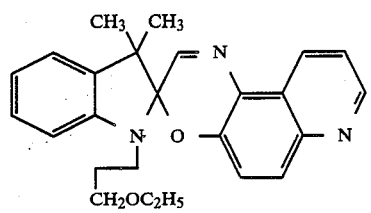

It is to be noted that the compound B was a mixture containing one part by weight of a first compound ($R^5$ =H, $R^6$=$CH_3$) and one part by weight of a second compound ($R^5$=$CH_3$, $R^6$=H).

Results of evaluation tests of the samples of Examples and Comparative Examples are shown in FIGS. 1A to 1C. Although three spirooxazine compounds A, B and C were used in Examples, it will be understood that the spirooxazine compound of the present invention may not be limited to them. The results of evaluation tests demonstrate that the photochromic materials of the Examples exhibited more than 50% coloring ability of the initial value even after light radiation of 2000 hours while the photochromic materials of the Comparative Examples exhibited less than 50% coloring ability of the initial value even after light radiation of within 400 hours.

EXAMPLE 2-1

1% by weight of the spirooxazine compound A as same as in Example 1, 1% by weight of the nitroxy free radical as same as in Example 1 and 10% by theweight of polyvinyl butyral containing plasticizer were dissolved in solvent (ethanol:toluene:n-butanol=50:45:5) to obtain a solution. The thus obtained solution was printed on the film of polyvinyl butyral by using a screen formed of polyethylene terephthalate (trade name: Tetoron) and of 100 mesh so as to form a printed film having a thickness of 20 μm. The thus obtained printed film was air-dried for a day and thereafter dried at 60° C. for 1-2 minutes thereby forming a photochromic intermediate film.

The intermediate film was put between two clear glass base plates. Then the clear glass base plates were tightly attached with the intermediate film under vacuum thereby to produce a laminated glass or sample of Example 2-1.

COMPARATIVE EXAMPLE 2-1

A laminated glass or sample of Comparative Example 2-1 was produced in a manner similar to that in Example 2-1 with the exception that no nitroxy free radial was used.

EXAMPLES 2 to 2-51 and COMPARATIVE EXAMPLES 2-2 and 2-3

Laminated glasses or samples of Examples 2-2 to 2-51 were produced in manner similar to that Example 2-1 with the exception that the spirooxazine compounds B and C in Examples 1-2 to 1-36 were used in combination with a variety of nitroxy free radials shown in Tables 2A to 2E. Additionally, laminated glasses or samples of Comparative Examples, 2-2 and 2-3 were produced in a manner similar to that in Examples 2-2 to 2-51 with the exception that no nitroxy free radial was used.

Evaluation tests were conducted on the samples of Examples 2-1 to 2-51 and Comparative Examples 2-1 to 2-3 in manners similar to in Examples 1-1. Results of evaluation tests are shown in Tables 2A to 2E and demonstrate that the photochromic materials in the laminated glasses of Examples 2-1 to 2-51 exhibited more than 50% coloring ability of the initial value even after being subjected to light radiation of 2000 hours while the photometric materials in the laminated glasses of Comparative Examples 2-1 to 2-3 exhibited less than 50% coloring ability of the initial value even after being subjected to light radiation of within 400 hours.

EXAMPLE 3-1 and EXAMPLE 4-1

1% by weight of the spirooxazine compound as used as in Example 1-1, 1% by weight of nitroxy free radical (2,2,5,5-tetramethyl, pyrrolidinyl oxycarboxyamide) of the following structure:

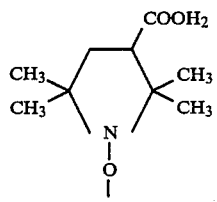

1% by weight of a hindered phenolic primary antioxidant (trademark "Irganox 1010" and manufactured by Ciba-Geigy) of the above-mentioned structure D-27 and 10% by weight of polyvinyl butyral containing plasticizer were dissolved in solvent (ethanol:toluene:n-buthanol=50:45:5) to obtain a solution. The thus obtained solution was coated on a glass base plate by means of casting to form a coating film. The formed coating film was dried for 6 hours in a vacuum drier under vacuum. Thereafter, a glass plate was put on and tightly attached to the dried coating film under vacuum so that the dried coating film was interposed between the two glass plates, thereby to produce a photosensitive arrangement of Example 4-1 including the photochromic material of the present invention.

Additionally, a photosensitive arrangement of Example 3-1 was produced in a manner similar to that in Example 4-1 with the exception that no hindered phenolic antioxidant was used.

In order to evaluate performance (dark place preservation ability), evaluation tests were conducted on the samples of Example 3-1 and Example 4-1 as follows: Each sample was put in a constant temperature and humidity oven (temperature: 55° C., and relative humidity: 0%) to accomplish a yellowing promotion test. Then, an absorbance measurement was carried out for each sample to inspect whether or not there was an absorbance peak near 450 nm, in which occurrence of yellowing of the sample was judged with the absorbance peak. The results of the evaluation tests are shown in Table 3A and demonstrate that the sample (including no antioxidant) of Example 3-1 initiates its yellowing within 20 hours of the yellowing promotion test while the sample (including the antioxidant) of Example 4-1 did not initiate its yellowing even upon lapse of 100 hours of the yellowing promotion test.

EXAMPLES 3-2 and 3-3 and EXAMPLES 4-2 and 4-3

Photosensitive arrangements or samples of Examples 4-2 and 4-3 were produced in a manner similar to that 4-1 with the exception that the spirooxazine compounds B and C of Examples 1-2 to 1-36 were used. An evaluation test was carried out for each sample in a manner similar to that in Example 4-1 to evaluate the dark place preservation ability. The result is shown in Table 3A.

Additionally, photosensitive arrangements or samples of Examples 3-2 and 3-3 were produced in a manner similar to that in Examples 4-2 and 4-3 with the exception that the oxidant ("Irganox 1010") was not used. Evaluation test was conducted on each sample to evaluate the dark place preservation ability. The result of the test is shown in Table 3A.

EXAMPLE 4-4

A photosensitive arrangement or sample of Example 4-4 was produced in a manner similar to in Example 4-1 with the exception that 1% by weight of a singlet state oxygen quencher (trademark "Cyasorb UV-1084" and manufactured by American Cyanamid Co., Ltd) of the above-structure E-4 was used in place of the antioxidant of the structure D-27. An evaluation test was conducted on the sample in the same manner as in Example 4-1 to evaluate the dark place preservation ability. The result of the test is shown in Table 3A.

EXAMPLES 4-5 and 4-6

Photosensitive arrangements or samples of Examples 4-5 and 4-6 were produced in a manner similar to Examples 4-2 and 4-3 with the exception that 1% by weight of the singlet state oxygen quencher (trademark "Cyasorb UV-1084" and manufactured by American Cyanamid Co., Ltd) of the structure E-4 was used in place of the antioxidant of the structure D-27. An evaluation test was conducted on each sample in the same manner as manner as that in Example 4-1 to evaluate the dark place preservation ability. The result of the test is shown in Table 3A.

EXAMPLE 4-7

A photosensitive arrangement or sample of Example 4-7 was produced in a manner similar to that in Example 4-1 with the exception that 1% by weight of a hindered amine compound light stabilizer (trademark "Mark LA-57" and manufactured by Adeka Argus Chemical Co., Ltd in Japan) of the above-mentioned structure C-13 was used in place of the antioxidant of the structure D-27. An evaluation test was conducted on the sample in the same manner as in Example 4-1 to evaluate the dark place preservation ability. The result of the test is shown in Table 3A.

EXAMPLES 4-8 and 4-9

Photosensitive arrangements or samples of Examples 4-8 and 4-9 were produced in a manner similar to that in Examples 4-2 and 4-3 with the exception that 1% by weight of a hindered amine compound light stabilizer (trademark "Mark LA-57" and manufactured by Adeka Argus Chemical Co., Ltd) of the above-mentioned structure C-13 was used in place of the antioxidant of the structure D-27 An evaluation test was conducted on each sample in the same manner as in Example 4-1 to evaluate the dark place preservation ability. The result of the test is shown in Table 3A.

EXAMPLES 4-10 to 4-37

Photosensitive arrangements of samples of Examples 4-10 to 4-37 were produced in a manner similar to that in Example 4-1 with the exception that the spirooxazine compound B of Example 4-2 was used as a photochromic compound, nitroxy free radicals shown in Tables 3B to 3F were used, and one of the antioxidant (phenolic compound), the singlet state quencher (nickel complex) and the light stabilizer (hindered amine compound) was used for each sample. An evaluation test was conducted on each in the same manner as in Example 4-1 to evaluate the dark place preservation ability. The result of the test is shown in Tables 3B to 3F.

EXAMPLES 4-38 to 4-48

Photosensitive arrangements of samples of Examples 4-38 to 4-48 were produced in manners similar to in Example 4-1 with the exception that the spirooxazine compound B of Example 4-2 was used as the photochromic compound, the nitroxy free radical shown in Table 3F and 3G was used, and two of the antioxidant (phenolic compound) the singlet state quencher (nickel complex) and the light stabilizer (hindered amine compound) shown in Table 3D were used each in an amount of 0.5% by weight for each Example. An evaluation test was conducted on each sample in the same manner as in Example 4-1 to evaluate the dark place preservation ability. The result of the test is shown in Table 3F and 3G.

EXAMPLES 4-49 to 4-51

Photosensitive arrangements or samples of Examples 4-49 to 4-51 were produced in a manner similar to that in Example 4-1 with the exception that the spirooxazine compound B of Example 4-2 was used as the photochromic compound, and the antioxidant (phenolic compound), the singlet state quencher (nickel complex) and the light stabilizer (hindered amine compound) shown in Table 3D were used (each in amount of 0.4% by weight) for each sample. An evaluation test was conducted on each sample in the same manner as in Example 4-1 to evaluate the dark place preservation ability. The result of the test is shown in Table 3D.

TABLE 1

| | PHOTOCHROMIC COMPOUND | NITROXY RADICAL | EVALUATION (Hrs.) |
|---|---|---|---|
| COMPARATIVE EXAMPLE | | | |
| 1-1 | A | Nil | <400 |
| 1-2 | B | Nil | <400 |
| 1-3 | C | Nil | <400 |
| EXAMPLE | | | |
| 1-1 | A | $(t\text{-Bu})_2\text{NO}\cdot$ | >2,000 |
| 1-2 | B | " | >2,000 |
| 1-3 | C | " | >2,000 |
| 1-4 | A | 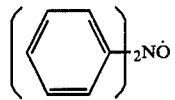 | >2,000 |
| 1-5 | B | " | >2,000 |
| 1-6 | C | 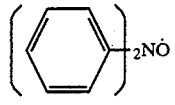 | >2,000 |
| 1-7 | A | 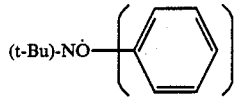 | >2,000 |
| 1-8 | B | " | >2,000 |
| 1-9 | C | " | >2,000 |
| 1-10 | A | 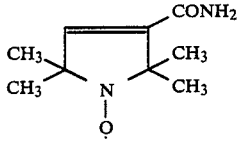 | >2,000 |
| 1-11 | B | 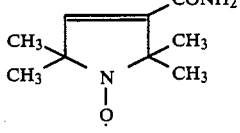 | >2,000 |
| 1-12 | C | " | >2,000 |

TABLE 1-continued

| | PHOTOCHROMIC COMPOUND | NITROXY RADICAL | EVALUATION (Hrs.) |
|---|---|---|---|
| 1-13 | A | 3-carbamoyl-2,2,5,5-tetramethylpyrrolidine-1-oxyl (CONH₂, CH₃, CH₃, CH₃, CH₃, N-O·) | >2,000 |
| 1-14 | B | " | >2,000 |
| 1-15 | C | " | >2,000 |
| 1-16 | A | (t-Bu)₂C=NO· | >2,000 |
| 1-17 | B | " | >2,000 |
| 1-18 | C | " | >2,000 |
| 1-19 | A | 2,2,3,3-tetramethyl-5-phenyl-imidazoline-1,3-dioxide | >2,000 |
| 1-20 | B | " | >2,000 |
| 1-21 | C | 2,2,3,3-tetramethyl-5-phenyl-imidazoline-1,3-dioxide variant | >2,000 |
| 1-22 | A | [bis(2,6-dimethoxyphenyl)]NO· | >2,000 |
| 1-23 | B | " | >2,000 |
| 1-24 | C | " | >2,000 |
| 1-25 | A | (2,4-dimethoxy-... )N-O·(t-Bu) | >2,000 |
| 1-26 | B | " | >2,000 |
| 1-27 | C | " | >2,000 |
| 1-28 | A | bicyclic N—O· | >2,000 |
| 1-29 | B | " | >2,000 |
| 1-30 | C | " | >2,000 |

TABLE 1-continued
| | PHOTOCHROMIC COMPOUND | NITROXY RADICAL | EVALUATION (Hrs.) |
|---|---|---|---|
| 1-31 | A | 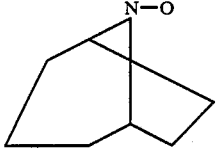 | >2,000 |
| 1-32 | B | " | >2,000 |
| 1-33 | C | " | >2,000 |
| 1-34 | A | 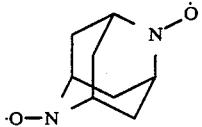 | >2,000 |
| 1-35 | B | " | >2,000 |
| 1-36 | C | " | >2,000 |
TABLE 2
| | PHOTOCHROMIC COMPOUND | NITROXY RADICAL | EVALUATION (Hrs.) |
|---|---|---|---|
| COMPARATIVE EXAMPLE | | | |
| 2-1 | A | Nil | <400 |
| 2-2 | B | " | <400 |
| 2-3 | C | " | <400 |
| EXAMPLE | | | |
| 2-1 | A | (t-Bu)$_2$NȮ | >2,000 |
| 2-2 | B | " | >2,000 |
| 2-3 | C | " | >2,000 |
| 2-4 | A | 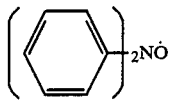 | >2,000 |
| 2-5 | B | " | >2,000 |
| 2-6 | C | " | >2,000 |
| 2-7 | A | 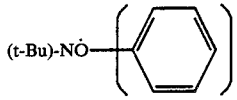 | >2,000 |
| 2-8 | B | " | >2,000 |
| 2-9 | C | " | >2,000 |
| 2-10 | A | 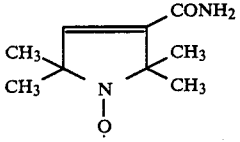 | >2,000 |
| 2-11 | B | 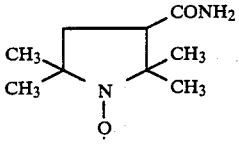 | >2,000 |
| 2-12 | C | " | >2,000 |

TABLE 2-continued

| | PHOTOCHROMIC COMPOUND | NITROXY RADICAL | EVALUATION (Hrs.) |
|---|---|---|---|
| 2-13 | A | 2,2,5,5-tetramethyl-3-carbamoyl pyrrolidine nitroxide | >2,000 |
| 2-14 | B | " | >2,000 |
| 2-15 | C | " | >2,000 |
| 2-16 | A | $(t\text{-Bu})_2C=NO\cdot$ | >2,000 |
| 2-17 | B | " | >2,000 |
| 2-18 | C | " | >2,000 |
| 2-19 | A | 2,2,5,5-tetramethyl-3-phenyl-imidazolidine-1,3-dioxide | >2,000 |
| 2-20 | B | " | >2,000 |
| 2-21 | C | " | >2,000 |
| 2-22 | A | $\{(2,6\text{-dimethoxyphenyl})\}_2\text{N}\dot{\text{O}}$ | >2,000 |
| 2-23 | B | $\{(2,6\text{-dimethoxyphenyl})\}_2\text{N}\dot{\text{O}}$ | >2,000 |
| 2-24 | C | " | >2,000 |
| 2-25 | A | (2,4-dimethoxy-phenyl)(t-Bu)N-O· with OCH$_3$ substituent | >2,000 |
| 2-26 | B | " | >2,000 |
| 2-27 | C | " | >2,000 |
| 2-28 | A | bicyclic aziridine N-oxide | >2,000 |
| 2-29 | B | " | >2,000 |
| 2-30 | C | " | >2,000 |

TABLE 2-continued

| | PHOTOCHROMIC COMPOUND | NITROXY RADICAL | EVALUATION (Hrs.) |
|---|---|---|---|
| 2-31 | A | (bicyclic nitroxide structure) | >2,000 |
| 2-32 | B | " | >2,000 |
| 2-33 | C | " | >2,000 |
| 2-34 | A | (diazaadamantane dinitroxide structure) | >2,000 |
| 2-35 | B | (diazaadamantane dinitroxide structure) | >2,000 |
| 2-36 | C | " | >2,000 |
| 2-37 | A | (N—H diazaadamantane nitroxide structure) | >2,000 |
| 2-38 | B | " | >2,000 |
| 2-39 | C | " | >2,000 |
| 2-40 | A | (N—CH$_3$ diazaadamantane nitroxide structure) | >2,000 |
| 2-41 | B | " | >2,000 |
| 2-42 | C | " | >2,000 |
| 2-43 | A | (bis-TEMPO terephthalate structure) | >2,000 |
| 2-44 | B | " | >2,000 |
| 2-45 | C | " | >2,000 |
| 2-46 | A | (piperazinone nitroxide structure) | >2,000 |
| 2-47 | B | " | >2,000 |
| 2-48 | C | " | >2,000 |

TABLE 2-continued
| | PHOTOCHROMIC COMPOUND | NITROXY RADICAL | EVALUATION (Hrs.) |
|---|---|---|---|
| 2-49 | A | 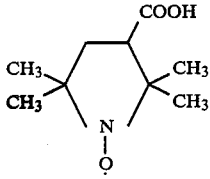 | >2,000 |
| 2-50 | B | " | >2,000 |
| 2-51 | C | " | >2,000 |

TABLE 3

| EX-AM-PLE | PHOTO-CHROMIC COMPOUND | NITROXY RADICAL | ANTIOXIDANT | SINGLET STATE OXYGEN QUENCHER | LIGHT STABILIZER | EVALU-ATION (Hrs.) |
|---|---|---|---|---|---|---|
| 3-1 | A | ![nitroxy radical with CONH2 and N-O] | Nil | Nil | Nil | <20 |
| 3-2 | B | " | " | " | " | " |
| 3-3 | C | " | " | " | " | " |
| 4-1 | A | " | ![antioxidant: HO-phenyl-(CH2CH2COOCH2)4-C] | " | " | >100 |
| 4-2 | B | " | " | " | " | " |
| 4-3 | C | " | " | " | " | " |
| 4-4 | A | " | Nil | ![Ni complex: S-bridged bis(phenol) with iC8H17 groups, Ni—NH2C4H9] | " | " |
| 4-5 | B | " | " | " | " | " |
| 4-6 | C | " | " | " | " | " |
| 4-7 | A | " | " | Nil | ![HALS: piperidine NH with R: CH2COOR-CHCOOR-CHCOOR-CH2COOR] | " |
| 4-8 | B | ![nitroxy radical with CONH2 and N-O] | Nil | Nil | ![HALS: piperidine NH with R: CH2COOR-CHCOOR-CHCOOR-CH2COOR] | >100 |
| 4-9 | C | " | " | " | " | " |

| EX-AM-PLE | PHOTO-CHROMIC COMPOUND | NITROXY RADICAL | ANTIOXIDANT | SINGLET STATE OXYGEN QUENCHER | LIGHT STABILIZER | EVALU-ATION (Hrs.) |
|---|---|---|---|---|---|---|
| 4-10 | B | " |  | " | Nil | " |
| 4-11 | " | " | 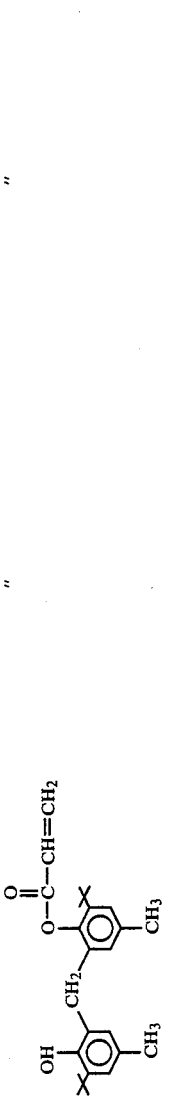 | " | " | " |
| 4-12 | " | " | Nil | " | 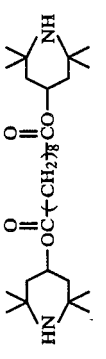 | " |
| 4-13 | " | " | " | " | 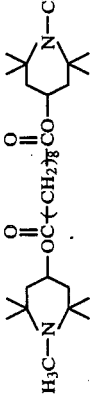 | " |
| 4-14 | " | " | " | " | 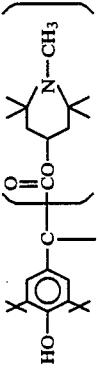 | " |
| 4-15 | B | $(^tBu)_2$—NO. | 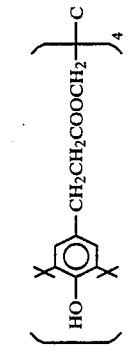 | Nil | Nil | >100 |
| 4-16 | " |  | " | " | " | " |

TABLE 3-continued
| EXAMPLE | PHOTOCHROMIC COMPOUND | NITROXY RADICAL | ANTIOXIDANT | SINGLET STATE OXYGEN QUENCHER | LIGHT STABILIZER | EVALUATION (Hrs.) |
|---|---|---|---|---|---|---|
| 4-17 | " | | " | " | " | " |
| 4-18 | " |  | " | " | " | " |
| 4-19 | " |  | " | " | " | " |
| 4-20 | " | 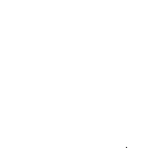 | " | " | " | " |
| 4-21 | " |  | " | " | " | " |
| 4-22 | " |  | " | " | " | " |
| 4-23 | B |  |  | Nil | Nil | >100 |
| 4-24 | " |  | " | " | " | " |

TABLE 3-continued
| EX-AM-PLE | PHOTO-CHROMIC COMPOUND | NITROXY RADICAL | ANTIOXIDANT | SINGLET STATE OXYGEN QUENCHER | LIGHT STABILIZER | EVALU-ATION (Hrs.) |
|---|---|---|---|---|---|---|
| 4-25 | " | 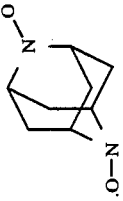 | " | " | " | " |
| 4-26 | " | (tBu)₂—NO. | Nil | 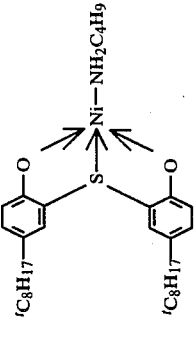 | " | " |
| 4-27 | " | 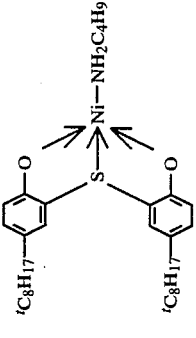 | " | " | " | " |
| 4-29 | " | tBu-N-O. (with phenyl) | " | " | " | " |
| 4-30 | " | CONH₂ piperidinyl-N-O. | " | " | " | " |
| 4-31 | B | (tBu)₂—NO. | Nil | (Ni complex structure) | Nil | >100 |

TABLE 3-continued
| EX-AM-PLE | PHOTO-CHROMIC COMPOUND | NITROXY RADICAL | ANTIOXIDANT | SINGLET STATE OXYGEN QUENCHER | LIGHT STABILIZER | EVALU-ATION (Hrs.) |
|---|---|---|---|---|---|---|
| 4-32 | " | 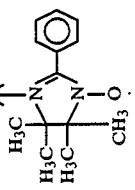 | " | " | " | " |
| 4-33 | " | 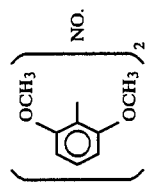 | " | " | " | " |
| 4-34 | " | 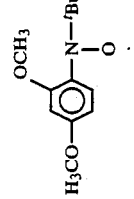 | " | " | " | " |
| 4-35 | " | 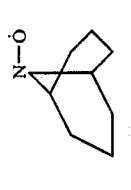 | " | " | " | " |
| 4-36 | " | 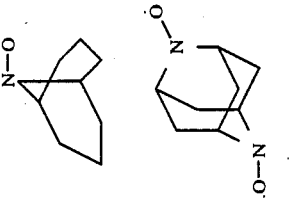 | " | " | " | " |
| 4-37 | B |  | Nil |  | Nil | >100 |

TABLE 3-continued

| EXAMPLE | PHOTO-CHROMIC COMPOUND | NITROXY RADICAL | ANTIOXIDANT | SINGLET STATE OXYGEN QUENCHER | LIGHT STABILIZER | EVALUATION (Hrs.) |
|---|---|---|---|---|---|---|
| 4-38 | " | (4-CONH$_2$-TEMPO structure) | (hindered phenol with -CH$_2$CH$_2$COOCH$_2$-C)$_4$ | Nil | piperidine with R: -CH$_2$COOR / -CHCOOR / -CHCOOR / -CH$_2$COOR | " |
| 4-39 | " | " | " | bis(octylphenol)sulfide Ni complex with NH$_2$C$_4$H$_9$ | Nil | " |
| 4-40 | " | " | bis(hydroxy-dimethylphenyl)sulfide | " | " | " |
| 4-41 | " | " | " | Nil | piperidine with R: -CH$_2$COOR / -CHCOOR / -CHCOOR / -CH$_2$COOR | " |
| 4-42 | " | " | (acrylate of hindered phenol methylene bridged) | " | " | " |

TABLE 3-continued

| EXAMPLE | PHOTO-CHROMIC COMPOUND | NITROXY RADICAL | ANTIOXIDANT | SINGLET STATE OXYGEN QUENCHER | LIGHT STABILIZER | EVALUATION (Hrs.) |
|---|---|---|---|---|---|---|
| 4-43 | B | (structure with CONH₂) | (phenolic acrylate structure) | (Ni complex with NH₂C₄H₉) | Nil | >100 |
| 4-44 | " | " | (hindered phenol tetraester structure) | Nil | (bis-piperidinyl sebacate, NH) | " |
| 4-45 | " | " | " | " | (bis-piperidinyl sebacate, N—CH₃) | " |
| 4-46 | " | " | " | " | (piperidinyl ester with C₄H₉, N—CH₃)₂ | " |
| 4-47 | " | " | Nil | (Ni complex with NH₂C₄H₉) | " | " |
| 4-48 | " | " | " | " | (piperidine structure, NH; R: CH₂COOR, CHCOOR, CHCOOR, CH₂COOR) | " |

TABLE 3-continued
| EXAMPLE | PHOTOCHROMIC COMPOUND | NITROXY RADICAL | ANTIOXIDANT | SINGLET STATE OXYGEN QUENCHER | LIGHT STABILIZER | EVALUATION (Hrs.) |
|---|---|---|---|---|---|---|
| 4-49 | B | 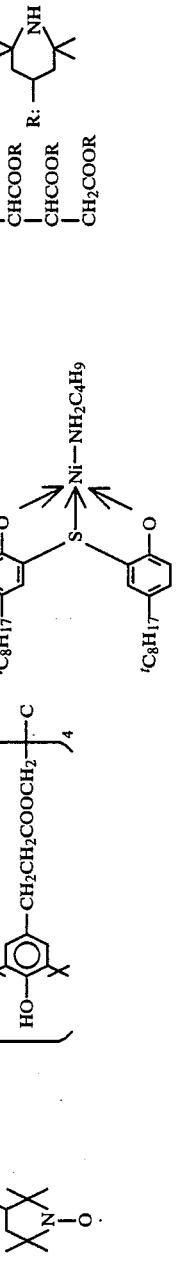 | 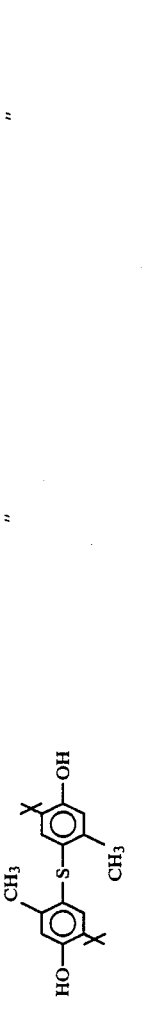 |  | 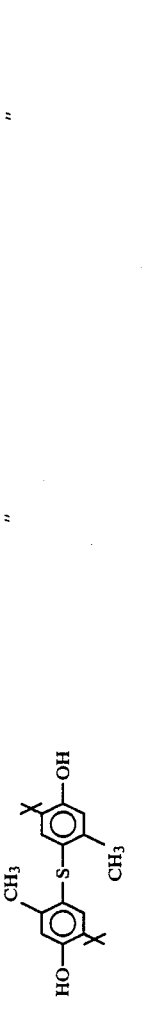 | >100 |
| 4-50 | " | " | 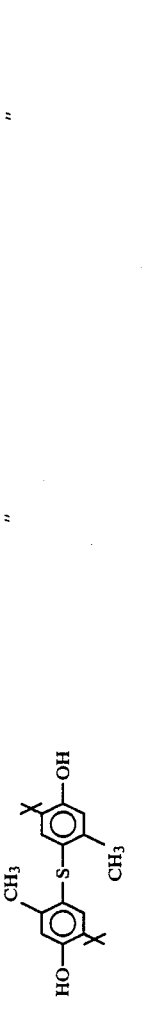 | " | " | " |
| 4-51 | " | " | (structure shown) | " | " | " |

What is claimed is:

1. A photochromic material comprising:
   a substrate material formed of high polymer;
   a spirooxazine compound contained in said substrate material and expressed by the general formula:

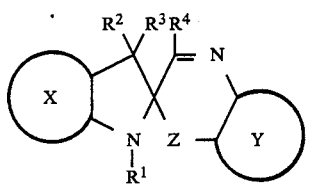

where $R^1$, $R^2$ and $R^3$ are selected from the group consisting of alkyl group, alkenyl group, cycloalkyl group and aryl group; $R^4$ is selected from the group consisting of hydrogen atom and alkyl group having the number of carbon atoms ranging from 1 to 5; rings X and Y are selected from the group consisting of hydrocarbon aromatic ring and heterocyclic aromatic ring; and Z is selected from the group consisting of oxygen atom and sulfur atom; and
   a triplet state quencher contained in said substrate material, said triplet state quencher being a nitroxy free radical.

2. A photochromic material as claimed in claim 1, wherein said $R^2$ and $R^3$ form a ring.

3. A photochromic material as claimed in claim 1 wherein said $R^1$ is another spirooxazine ring bonded through a group selected from the group consisting of alkylene group and arylene group.

4. A photochromic material as claimed in claim 1, wherein said at least one of the rings X and Y is substituted.

5. A photochromic material as claimed in claim 1, wherein said spirooxazine compound is expressed by the general formula:

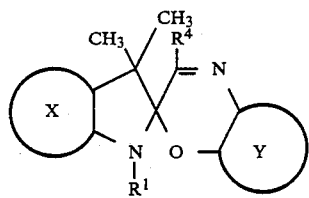

where $R^1$ is one selected from the group consisting of alkyl group having the number of carbon atoms ranging from 1 to 20 and alkoxyalkyl group; $R^4$ is selected from the group consisting of hydrogen atom and methyl group; rings X and Y are selected from the group consisting of hydrocarbon aromatic ring and heterocyclic aromatic ring.

6. A photochromic material as claimed in claim 1, wherein said $R^1$, $R^2$ and $R^3$ is selected from the group consisting of alkyl group having the number of carbon atoms ranging from 1 to 28, alkoxyalkyl group, alkoxyalkoxyalkyl group, alkoxyalkoxyalkoxyalkyl group, aryloxyalkyl group, arylalkyl group, cycloalkylalkyl group, alkenyloxyalkyl group, cyanoalkyl group, hydroxyalkyl group, and tetrahydrofurfurylalkyl group.

7. A photochromic material as claimed in claim 1, wherein each of said rings X and Y is selected from group consisting of benzene ring, naphthalene rings, quinoline rings and phenanthrene rings.

8. A photochromic material as claimed in claim 4, wherein at least one of the rings X and Y is substituted by a member selected from the group consisting of a halogen atom, alkyl group having the number of carbon atoms ranging from 1 to 6, alkoxyl group, alkoxycarbonyl group, alkoxysulfonyl group, cyano group, amino group, dimethylamino group, and nitro group.

9. A photochromic material as claimed in claim 1, wherein said high polymer is one selected from the group consisting of polymethyl methacrylate, polystyrene, polyvinyl acetate, polyvinyl butyral, cellulose acetate, polyvinyl chloride, polyvinylidene chloride, vinyl chloride-vinyl acetate copolymer, polypropylene, polyethylene, polyacrylonitrile, polyurethane resin, epoxy resin, phenoxy resin, and polyester resin.

10. A photochromic material as claimed in claim 1, wherein said nitroxy free radical is selected from the group consisting of radicals expressed by the general formulae:

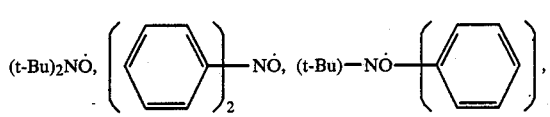

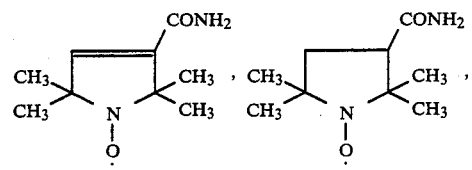

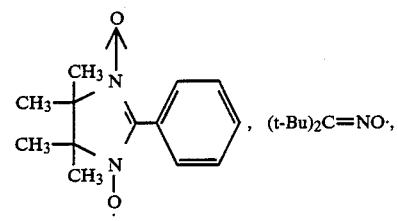

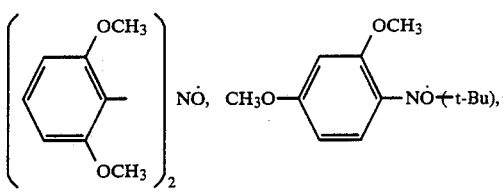

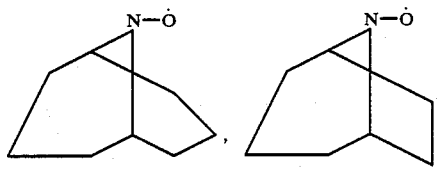

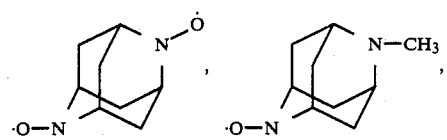

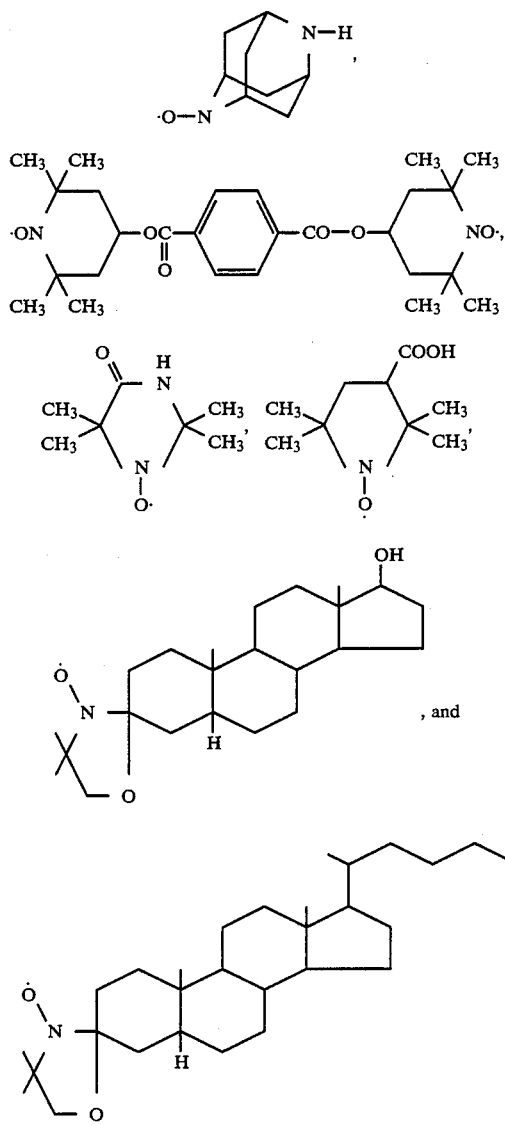

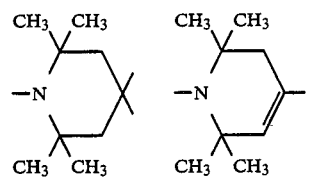

17. A photochromic material as claimed in claim 15, wherein said phenolic compound is expressed by the general formula:

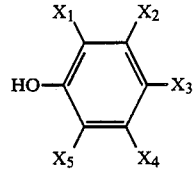

wherein $X^1$, $X^2$, $X^3$, $X^4$ and $X^5$ are selected from the group consisting of hydrogen atom, halogen atom, alkyl group, amino group, alkoxy group, phenoxy group, and hydroxy group.

18. A photochromic material as claimed in claim 15, wherein said nickel complex is selected from the group consisting of complexes expressed by the general formulae:

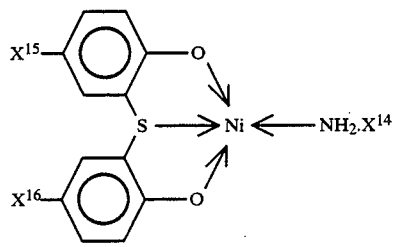

where $X^{14}$, $X^{15}$ and $X^{16}$ are alkyl groups having the number of carbon atoms ranging from 1 to 10; and

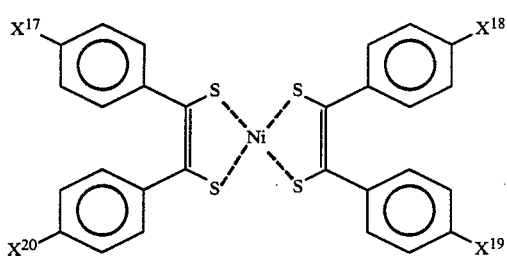

where $X^{17}$, $X^{18}$, $X^{19}$ and $X^{20}$ are selected from group consisting of hydrogen atom, alkyl group, and alkoxy group.

11. A photochromic material as claimed in claim 1, wherein content of said spirooxazine compound is within a range from 0.1 to 50% by weight relative to said substrate material.

12. A photochromic material as claimed in claim 11, wherein the content of said spirooxazine compound is within a range from 0.5 to 20% by weight relative to said substrate material.

13. A photochromic material as claimed in claim 1, wherein content of said triplet state quencher is within a range from 0.1 to 50% by weight relative to said substrate material.

14. A photochromic material as claimed in claim 13, wherein the content of said triplet state quencher is within a range from 0.5 to 20% by weight.

15. A photochromic material as claimed in claim 1, further comprising at least one compound selected from the group consisting of hindered amine compound, phenolic compound, and nickel complex.

16. A photochromic material as claimed in claim 15, wherein said hindered amine has at least one of the groups expressed by the formulae:

19. A photochromic material as claimed in claim 15, wherein total content of compounds selected from the group consisting of hindered amine compound, phenolic compound and nickel complex is within a range from 0.1 to 50% by weight relative to said substrate material.

20. A photochromic material as claimed in claim 19, wherein the total content of said compounds is within a range from 0.5 to 20% by weight relative to said substrate material.

21. A photochromic material as claimed in claim 19, wherein the total content of said compound is the same as content of said triplet state quencher.

22. A photosensitive arrangement comprising:
a plastic film; and
a photochromic material coated on said plastic film to form a layer, said photochroic material including
a substrate material formed of high polymer;
a sprirooxazine compound contained in said substrate material and expressed by the general formula:

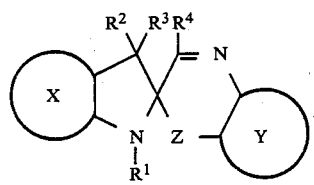

where $R^1$, $R^2$ and $R^3$ are selected from the group consisting of alkyl group, alkenyl group, cycloalkyl group and aryl group; $R^4$ is selected from the group consisting of hydrogen atom and alkyl group having the number of carbon atoms ranging from 1 to 5; rings X and Y are selected from the group consisting of hydrocarbon aromatic ring and heterocyclic aromatic ring; and Z is selected from the group consisting of oxygen atom and sulfur atom; and
a triplet state quencher of nitroxy free radical, contained in said substrate material.

23. A photosensitive arrangement as claimed in claim 22, wherein the layer of said photochromic material coated on said plastic film has a thickness ranging from 0.5 $\mu$ to 1 mm.

24. A photosensitive arrangement as claimed in claim 23, wherein the layer of said photochromic material has a thickness ranging from 10 to 250 $\mu$.

25. A photosensitive arrangement as claimed in claim 22, further comprising first and second base plates which are optically transparent, said plastic film with said photochromic material is securely interposed between said two base plates.

26. A photosensitive arrangement as claimed in claim 25, wherein each of said first and second base plates is formed of glass.

27. A photosensitive arrangement as claimed in claim 22, wherein said plastic film is the same in plastic material as said substrate material.

* * * * *